United States Patent
Wang et al.

(10) Patent No.: US 7,359,015 B1
(45) Date of Patent: *Apr. 15, 2008

(54) TRANSFLECTIVE LIQUID CRYSTAL DISPLAY USING SEPARATE TRANSMISSIVE AND REFLECTIVE LIQUID CRYSTAL CELLS AND MATERIALS WITH SINGLE CELL GAP

(75) Inventors: Qiong-Hua Wang, Chengdu (CN); Shin-Tson Wu, Oviedo, FL (US); Qi Hong, Orlando, FL (US); Yung-Hsun Wu, Oviedo, FL (US)

(73) Assignee: Research Foundation of the University of Central Florida, Orlando, FL (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/915,070

(22) Filed: Aug. 10, 2004

(51) Int. Cl.
   *G02F 1/1335* (2006.01)
   *G02F 1/1339* (2006.01)

(52) U.S. Cl. .................. 349/114; 349/156; 349/160; 349/187

(58) Field of Classification Search ............... 349/96, 349/114, 117, 119, 158, 160, 177, 178, 113, 349/156, 181, 187, 189
   See application file for complete search history.

(56) References Cited

U.S. PATENT DOCUMENTS

| | | | |
|---|---|---|---|
| 4,720,173 A | 1/1988 | Okada et al. | 350/341 |
| 6,020,941 A | 2/2000 | Ma | 349/15 |
| 6,281,952 B1 | 8/2001 | Okamoto | 349/12 |
| 6,285,434 B1 * | 9/2001 | Ma et al. | 349/189 |
| 6,295,109 B1 | 9/2001 | Kubo et al. | 349/119 |
| 6,330,047 B1 | 12/2001 | Kubo et al. | 349/147 |
| 6,950,158 B2 * | 9/2005 | Chang | 349/114 |
| 7,015,997 B2 * | 3/2006 | Choi et al. | 349/114 |
| 7,015,998 B2 * | 3/2006 | Lin | 349/114 |

FOREIGN PATENT DOCUMENTS

JP     2003-091006     * 3/2003

OTHER PUBLICATIONS

Partial computer-generated English translation of JP 2003-091006, Mar. 2003.*
Shin-Tson Wu and Deng-Ke Yang, "*Reflective Liquid Crystal Display*," John Wiley & Sons, LTD, 2001, Chapter 3, pp. 68-70, Chapter 4, pp. 98-104.

* cited by examiner

*Primary Examiner*—Dung T. Nguyen
*Assistant Examiner*—Tai Duong
(74) *Attorney, Agent, or Firm*—Brian S. Steinberger; Phyllis K. Wood; Law Offices of Brian S. Steinberger, P.A.

(57) ABSTRACT

A transflective liquid crystal display (TLCD) using separate transmissive (T) and reflective (R) cells in which two liquid crystal materials with different birefringence changes are used. The birefringence change of the R region is half of the birefringence change of the T region. In this case, a single cell gap is possible and identical transmittance and reflectance for R and T is obtained. It is applicable to various reflective LC modes, and the fabrication methods are simple.

2 Claims, 7 Drawing Sheets

TRANSFLECTIVE LIQUID CRYSTAL DISPLAY USING SEPARATE TRANSMISSIVE AND REFLECTIVE LIQUID CRYSTAL CELLS AND MATERIALS WITH SINGLE CELL GAP

This invention relates to transflective liquid crystal displays, and in particular to structures and fabrication methods for transflective liquid crystal displays (LCDs) having a single cell gap that use separate transmissive (T) and reflective (R) cells containing liquid crystal materials that differ only in the birefringence of the R region, which is half that of the T region.

BACKGROUND AND PRIOR ART

The transmissive liquid crystal display (LCD) exhibits a high contrast ratio and good color saturation. However, its power consumption is high due to the need of a backlight. At bright ambient, the display could be washed out completely. On the other hand, a reflective LCD uses ambient light for reading displayed images. Since it does not require a backlight, its power consumption is reduced significantly. However, its contrast ratio is lower and color saturation much inferior to those of the transmission type. At dark ambient, reflective LCD loses its visibility. Transflective LCDs use a combination of transmissive and reflective modes to provide improvements in image display and power consumption.

Figure 1:
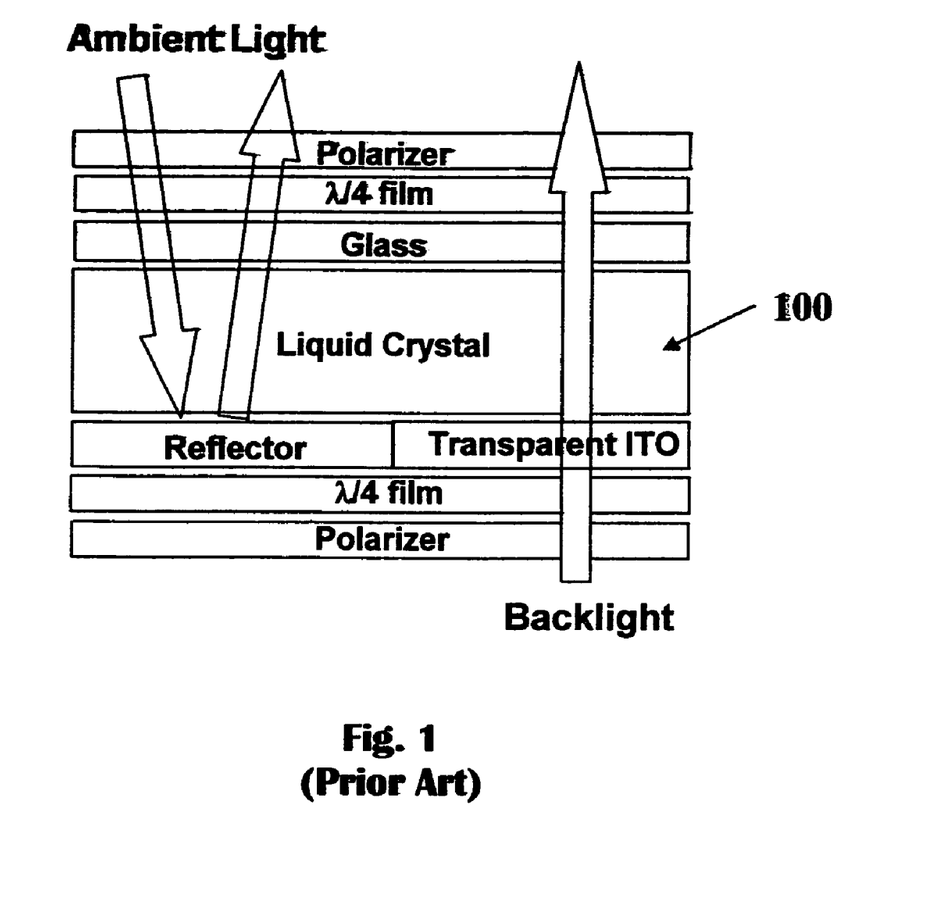
FIG. 1 shows a transflective LCD using a single cell gap (Prior Art).
Figure 2:
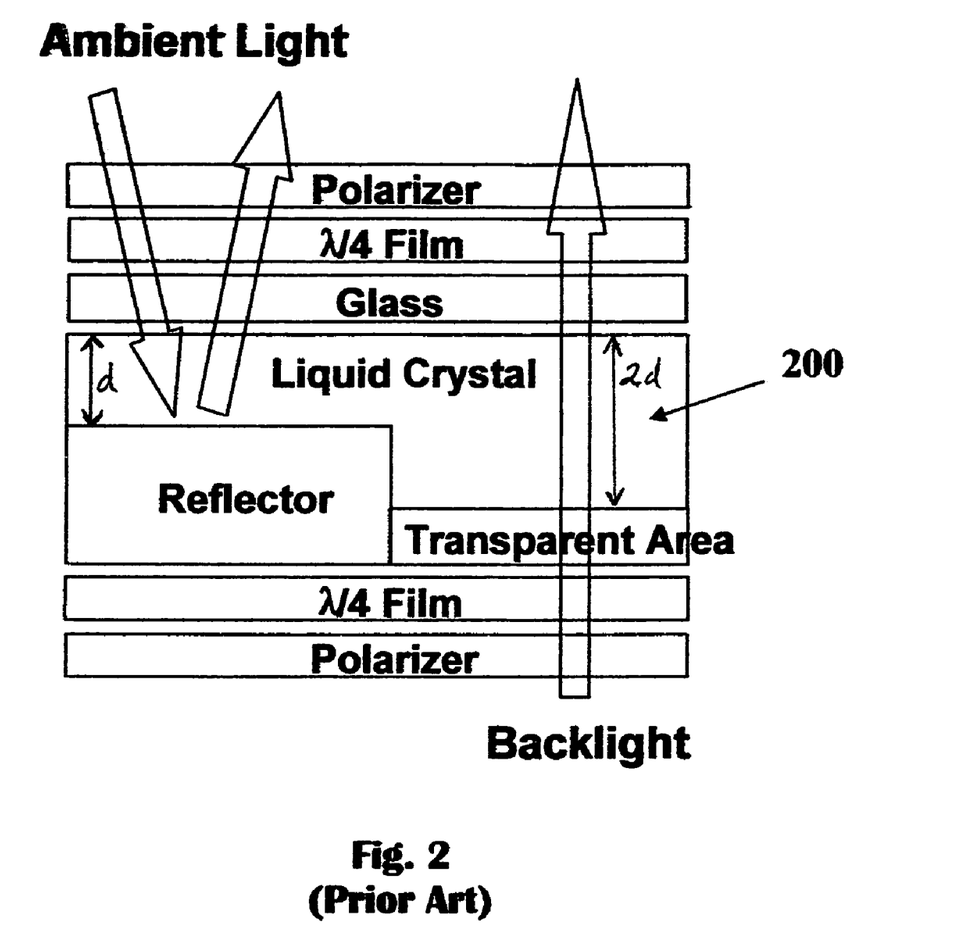
FIG. 2 shows a transflective LCD using a double cell gap (Prior Art).

Two types of transflective LCDs have been developed: single cell gap (FIG. 1) and double cell gap (FIG. 2).

A single cell transflective LCD is disclosed in U.S. Pat. Nos. 6,281,952 B1 to Okamoto et al.; 6,295,109 B1 to Kubo et al.; 6,330,047 B1 to Kubo et al., commonly assigned to Sharp Kabushiki Kaisha, which use a split-pixel approach, i.e. each pixel is split into reflective (R) and transmissive (T) sub-pixels. Usually, the R and T area ratio is 4:1, in favor of the transmissive display. The transmissive display is used for dark ambient only in order to conserve power.

In the conventional single cell gap approach shown in FIG. 1, the cell gap (d) 100 for R and T modes is the same. The cell gap is optimized for R-mode. As a result, the light transmittance for the T mode is lower than 50% because the light only passes through the LC layer once.

In the conventional double cell gap approach 200 shown in FIG. 2, the transflective LCD has separate transmission and reflection pixels in order to compensate the unmatched liquid crystal retardation. The cell gap is d and 2d for the R and T pixels, respectively. In this approach, both R and T have high light efficiency. However, the T mode has four times slower response time than that of the R mode. Moreover this approach has a complicated structure and fabrication process. Glass etching and indium-tin-oxide (ITO) electrode coating on the transmission region are needed. The cell gap accuracy and uniformity can be poor depending critically on how accurate and uniform the extra thick organic layer is formed. Poor cell gap accuracy and uniformity result in deteriorated LCD performances, such as variations in brightness and color.

U.S. Pat. No. 6,020,941 to Yao-Dong Ma employs switchable liquid crystal materials of two polarities in separate channels, a wall located in an interstice between the separate channels defines a first and a second set of independent cells in the LCD. A first controllable liquid crystal (CLC) material is located in the plurality of independent cells, the first CLC material selectively exhibits an "on" state and an "off" state and has a first polarity when in the "on" state; and a second CLC material located in the plurality of independent cells, the second CLC material selectively exhibits an "on" state and an "off" state and has a second polarity when in the "on" state.

Another cell wall structure is disclosed in U.S. Pat. No. 4,720,173 to Okada et al. and is used to improve the alignment or orientation of the liquid crystal molecules. There remains a need to improve the quality of liquid crystal displays and to provide them at lower costs.

SUMMARY OF THE INVENTION

A primary objective of the invention is to provide a new transflective liquid crystal display having single cell gap.

A secondary objective of the invention is to provide a new transflective liquid crystal display using separate T and R cells.

A third objective of the invention is to provide a new transflective liquid crystal display, in which T and R cells are filled with two liquid crystal materials that differ only in the birefringence of the R region to half of the T region.

A fourth objective of the invention is to provide a new transflective liquid crystal display with improved LCD quality with improved cell gap control since only single cell gap is required.

A fifth objective of the invention is to provide a new transflective liquid crystal display with a simpler structure and fabrication process compared with the double cell-gap approach. No spacer is needed since the wall which separates the R and T regions also act as the LCD spacer.

A sixth objective of the invention is to provide a new transflective liquid crystal display without a response time difference because of single cell-gap.

A seventh objective of the invention is to provide a new transflective liquid crystal display at a lower cost since no major extra component is required.

Further objects and advantages of this invention will be apparent from the following detailed description of a presently preferred embodiment which is illustrated schematically in the accompanying drawings.

BRIEF DESCRIPTION OF THE FIGURES

FIG. 7 shows normally white transflective LCD using a homogeneous cell of a mixed-mode twisted nematic (MTN) cell.

FIG. 7b shows the normally white transflective LCD of FIG. 7 in the dark state at V=ON.

FIG. 8 shows a normally black transflective LCD employing a vertically aligned LC cell.

FIG. 8b is a normally black transflective LCD employing a vertically aligned LC cell in the bright state at V=ON.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

In the present invention, when referring to the "transmissive or transmission" and "reflective or reflection" modes, the terms are sometimes abbreviated with T and R, respectively.

Two liquid crystal materials are used to fill two independent regions. Except for birefringence, the liquid crystal materials have all other properties that are the same. The birefringence satisfies the following equation:

$$\Delta n_T \approx 2\Delta n_R$$

where $\Delta n_T$ is the birefringence of liquid crystal in T region and $\Delta n_R$ is the birefringence of liquid crystal in R region. The present invention is different from the above prior arts. Because of birefringence, the light passing through a liquid crystal layer would experience an optical path difference which is defined as $\delta_T = d\Delta n_T$; where d is the LC cell gap. For the reflective pixels, the light passes the LC layer twice so that the incurred optical path difference is doubled, as shown by the following equation:

$$\delta_R = (\Delta n_R \times d) \times 2$$

Therefore, the optical path difference (or phase retardation) for the R and T pixels are equal:

$$\delta_R = \delta_T$$

Thus, the transmissive and reflective pixels will have the same light efficiency. That means if the T pixels exhibit 100% transmittance, then the R pixels will have 100% reflectance. Their gray scale performance will be very similar. This is particularly important when both T and R pixels are operating simultaneously.

In order to make T and R operate with the same characteristics, there are requirements for liquid crystal materials for this invention. The LC birefringence meets $\Delta n_T = 2\Delta n_R$. For example $\Delta n_T = 0.14$, $\Delta n_R = 0.07$. Other properties such as dielectric constants, splay elastic constants, and rotational viscosity should be maintained roughly the same to guarantee T and R regions have the same threshold voltage, response time and the like. The two-bottle liquid crystal mixtures (e.g., MLC-9200-000 and MLC-9200-100) developed by MERCK in Darmstadt, Germany have very similar physical properties, such as, phase transition temperatures, dielectric constants, and viscosity, except for different birefringence. Although the birefringence is not exactly different by a factor of two, further improvement can be made based on the specifications. Other research laboratories, such as the Photonics and Communications Laboratory at College of Optics and Photonics, University of Central Florida, can also formulate acceptable liquid crystal mixtures for the present invention.

Figure 3:
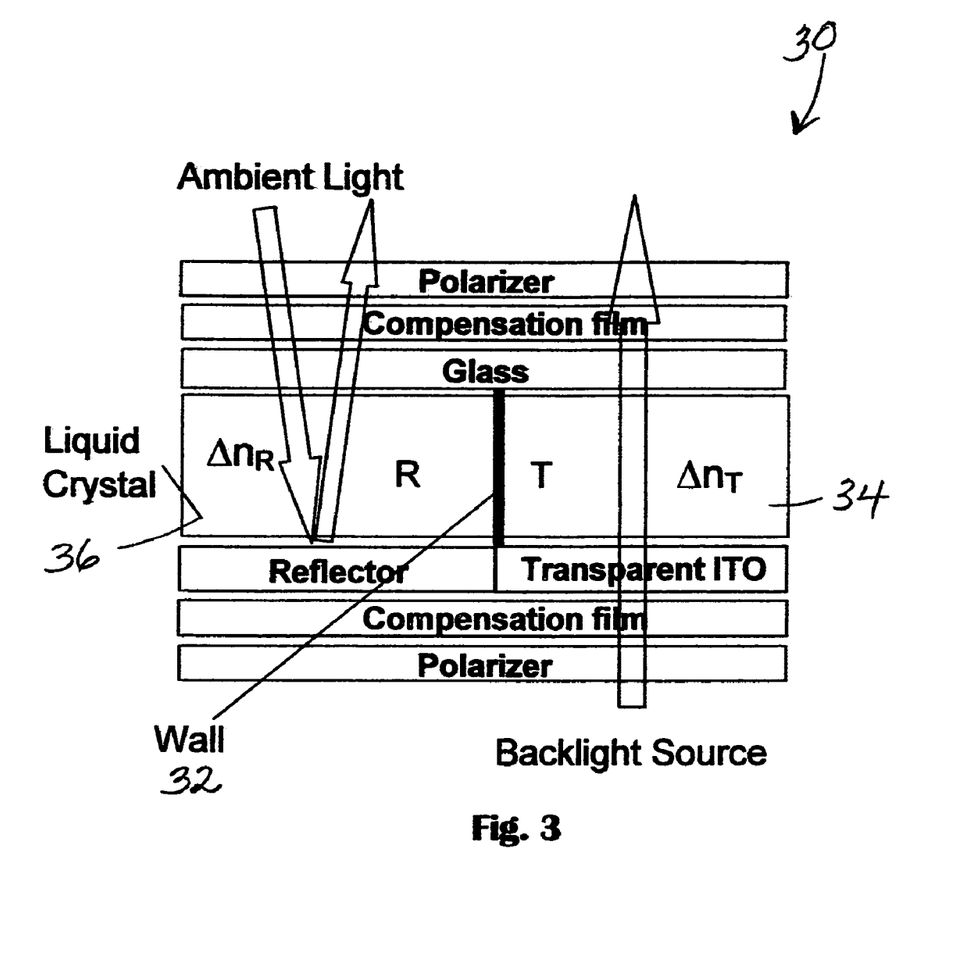
FIG. 3 shows the operating principle of a transflective LCD of the present invention, using a single cell gap with different birefringence for T and R regions.
Figure 4:
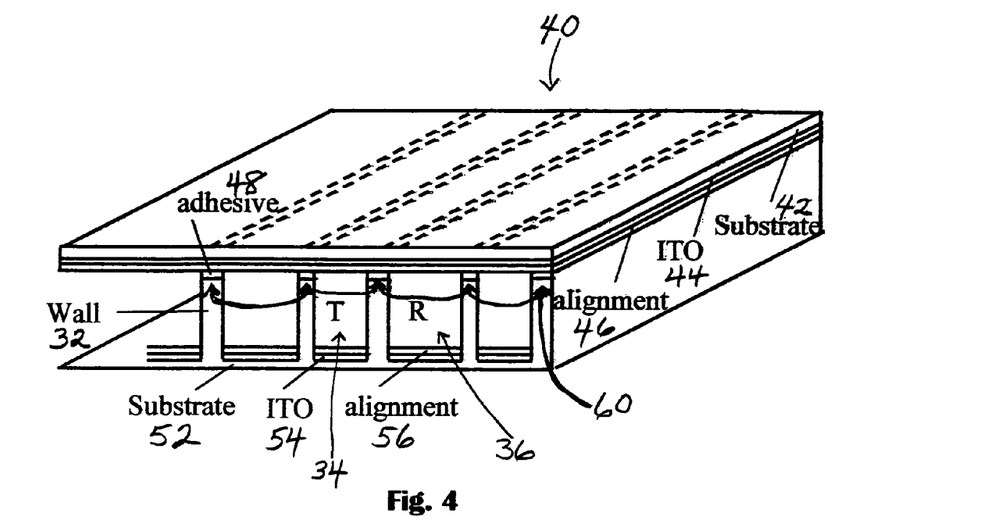
FIG. 4 shows the structure of a transflective LCD of the present invention, using a single cell gap with different birefringence for T and R regions.
Figure 5:
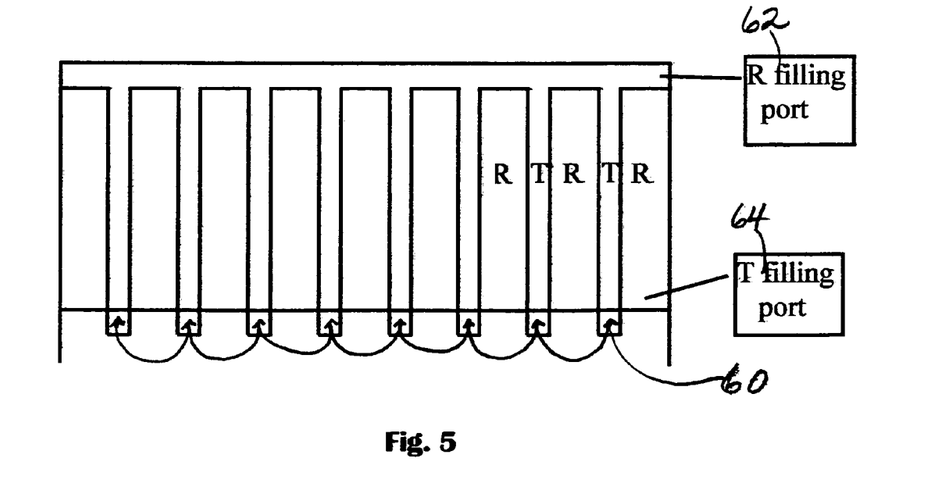
FIG. 5 shows the serpentine wall structure that defines the T and R independent cells.

Referring now to the transflective LCD 30 shown in FIG. 3, the cell wall 32 that defines the independent T and R cells 34, 36 is a serpentine wall structure 60 as shown in FIGS. 4 and 5. The cell wall 32 separates the T cell 34 from the R cell 36 and also acts as a spacer. Ambient light passes through a top linear polarizer into the reflective cell 36 of the liquid crystal and is reflected back. A backlight source faces a bottom linear polarizer layer and passes light through a transparent area located below the transmissive cell 34.

FIG. 4 provides further detail on the structure and fabrication process used to provide the novel transflective LCD 40 of the present invention. A liquid crystal material is sandwiched between a first transparent substrate 42 coated with an indium-tin-oxide ITO electrode layer 44 and an alignment layer 46 and a second transparent substrate 52 also coated with an ITO electrode layer 54 and an alignment layer 56. A wall 32 with a serpentine structure 60 divides the liquid crystal materials into independent cells T 34 and R 36. The wall structure 60 is held in place with an adhesive 48 which seals the wall 32 in place and also seals the periphery of the T and R cells.

FIG. 5 shows greater detail of the serpentine wall structure 60 as well as the fluid fill ports 62, 64 for filling the T and R cells, on opposing edges of the substrate. The set of independent T cells can be filled with a T liquid crystal material using a conventional vacuum-filling method, and then sealed using, for example, an epoxy. The set of independent R cells can then be filled with R liquid crystal material, again using a conventional vacuum-filling method, and then sealed.

The cell wall is designed just under the black matrix, so the aperture ratio for the present invention is the same as a conventional LCD. The wall structure may be of a type disclosed in U.S. Pat. Nos. 6,020,941 and 4,720,173, and the cell wall structures are incorporated herein by reference. The present invention is not restricted to a particular cell wall structure.

Referring to the fabrication of a cell wall, similar to U.S. Pat. No. 4,720,173, a polyimide film is formed in a thickness of 1000 Å on one of the transparent substrates or base plates. A polyimide film is formed on another transparent substrate or base plate in a cell gap thickness of approximately 5 micrometers (μm) for the present invention, which is then photoetched to leave a spacer stripe of approximately 10-20 μm width, equal to the width of the black matrix.

After the wall forming, the alignment process is the same as for a conventional LCD. For a transflective LCD, the pixel is approximately 240 μm and sub-pixel is approximately 80 μm, and even the wall is approximately 20 μm, the pixel width is much larger than the cell gap of approximately 5 μm. Therefore the alignment, rubbing or tilt vapor deposition is not affected by the wall.

Figure 6:
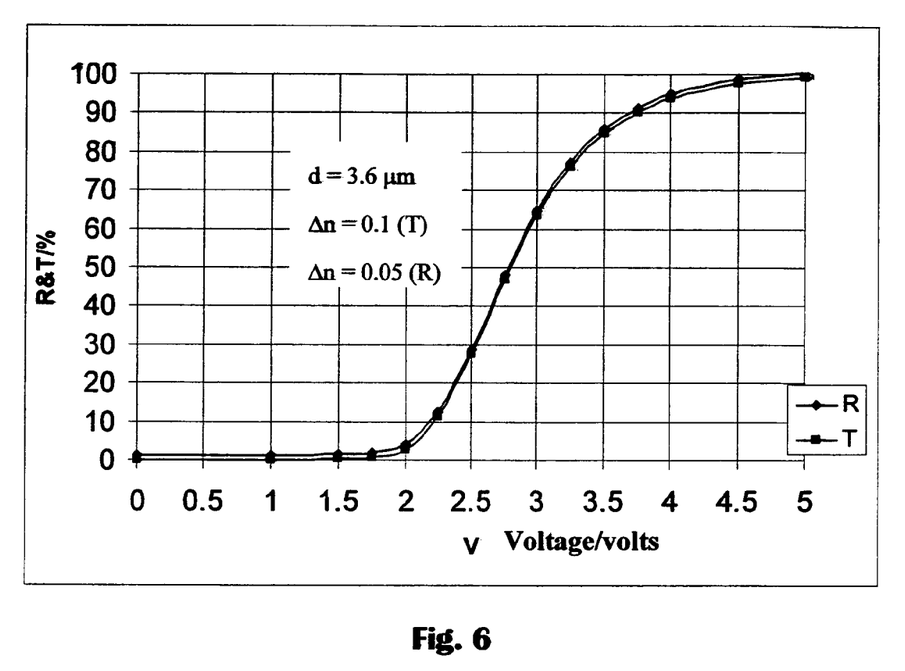
FIG. 6 shows the reflection and transmission vs. applied voltage of the transflective LCD using a vertically aligned LC cell as an example.

FIG. 6 shows the modeling results for the reflection and transmission vs. applied voltage of the transflective LCD of the present invention. It is obvious that both R and T reach 100% at V=5 $V_{rms}$.

Several outstanding features of the novel transflective LCD include but are not limited to, the features summarized below.

First, the transflective LCD of the present invention provides identical transmittance and reflectance for R and T cells, since T and R have the same retardation change, both have high, approximately 100%, light modulation efficiency, as shown in FIG. 6.

Second, in the present invention a single cell gap LCD is used, as shown in FIGS. 3 and 4. Because of the same cell gap, the R and T pixels have the same response time. The structure and fabrication process are simple. No spacer is needed since the wall which separates the R and T regions also act as the LCD spacer.

Third, the transflective LCD of the present invention is versatile. Several reflective LC modes can be considered. Below is an example of three different liquid crystal modes that can be embodied in the present invention. For examples, the mixed-mode twisted nematic (MTN) cell with various twist angles (90°, 80°, or 75°) offer normally white operation. The 90°-MTN cell exhibits a high contrast, but its reflectance is limited to ~88%. On the other hand, the 80° and 75° MTN cells have higher reflectance (~100%), but their contrast ratio is lower. In the MTN embodiment, a single $\lambda/4$ film and two polarizers are needed as disclosed by Wu and Yang, "Reflective Liquid Crystal Displays" (Wiley-SID, 2001), Ch. 4.

Another variation is the film-compensated homogeneous LC cell with $\lambda/4$ phase retardation. Similar to the above-mentioned examples, a single $\lambda/4$ film and two polarizers are needed as discussed by Wu and Yang, "Reflective Liquid Crystal Displays" (Wiley-SID, 2001), Ch. 3.

A further example of the versatility of the present invention, the vertical alignment LC cell with $\lambda/4$ phase retardation can also be embodied. In this embodiment, two $\lambda/4$ films and two polarizers are needed.

Figure 7A:
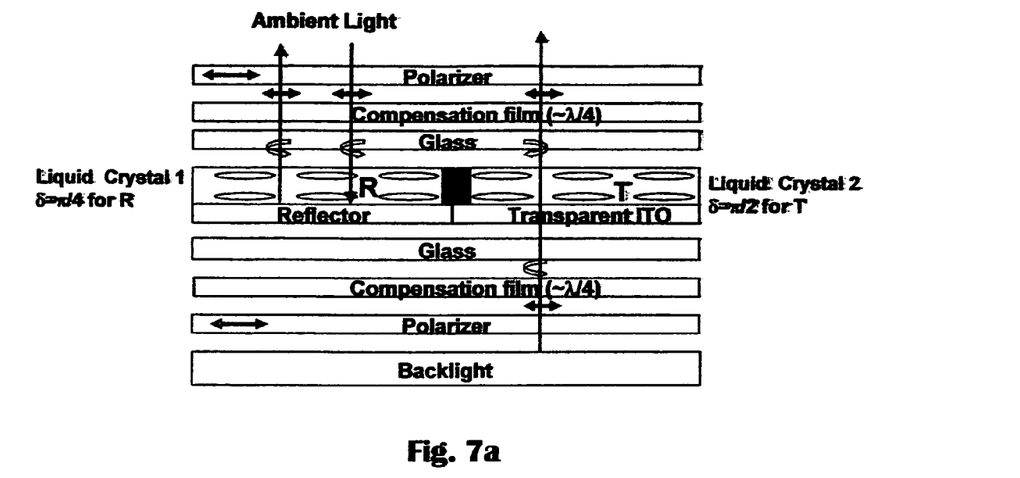
FIG. 7a shows the normally white transflective LCD of FIG. 7 in the bright state at voltage V=0.
Figure 7B:
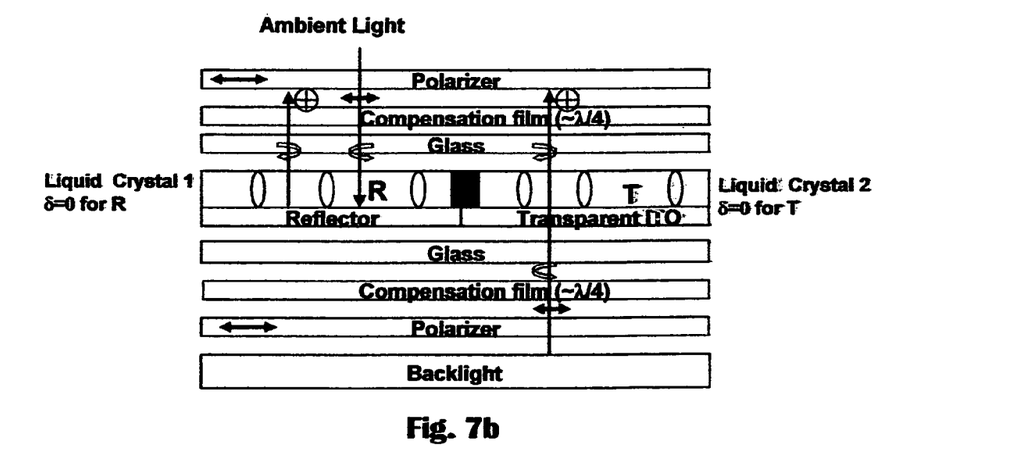

FIG. 7 illustrates the operating principles of the transflective LCD of the present invention employing a homogeneous LC cell as an example. The mixed-mode twisted nematic (MTN) cell should have a higher contrast ratio and lower operating voltage. In the V=0 state in FIG. 7a, the polarization of the back light and ambient light are shown in each stage. Here, the half circle symbols represent the circular polarization. With the arrow facing right (or left), they are right (or left) handed circular polarization. FIG. 7b is for V=ON state. The transmission and reflection of light in the separated T and R pixels provide a high quality display of images in any ambient light conditions. The major advantage of the MTN and film-compensated homogeneous cells is their simple fabrication process and low cost.

Figure 8A:
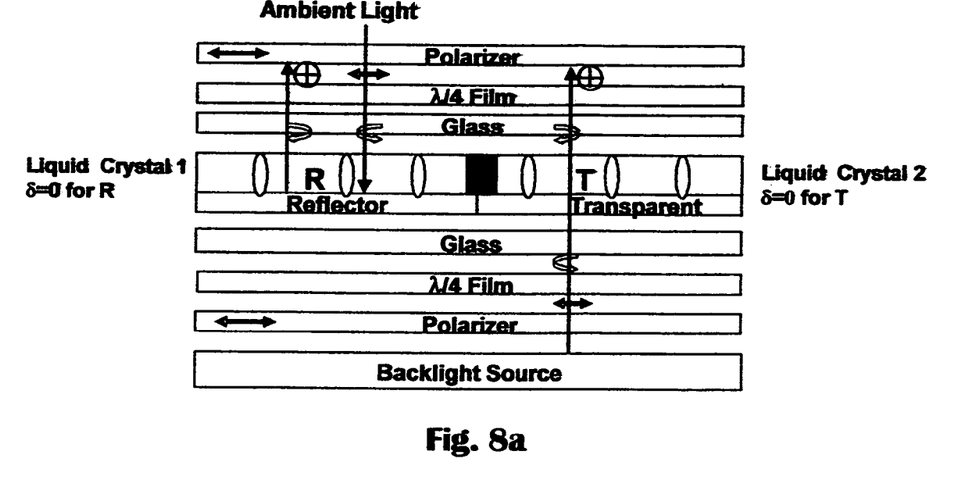
FIG. 8a is a normally black transflective LCD employing a vertically aligned LC cell in the dark state at V=0.
Figure 8B:
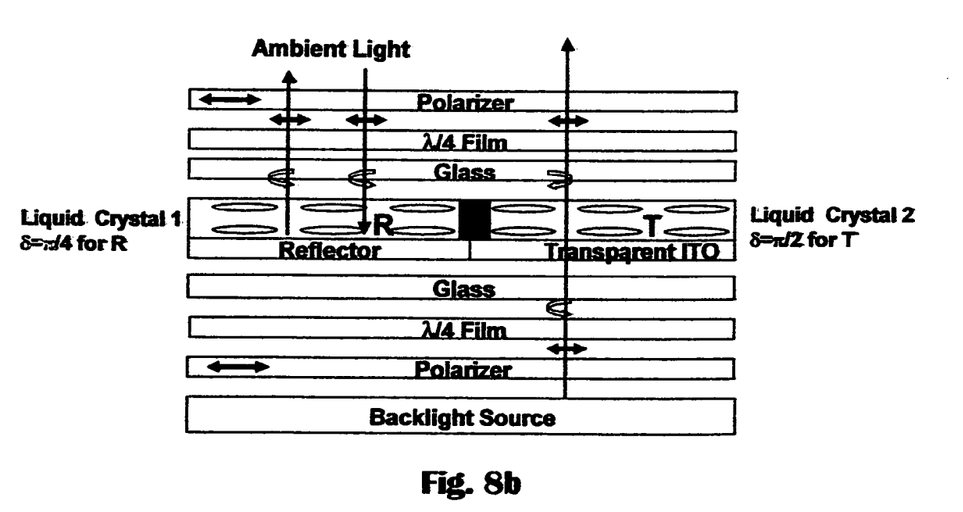

Similarly, FIG. 8 depicts a normally black mode using a vertical alignment LC cell. In the voltage-off state shown in FIG. 8a, the LC directors are perpendicular to the glass substrates. The effective phase retardation $\delta=2\pi d\Delta n/\lambda$ is equal to zero. As a result, both ambient and back light are blocked by the crossed polarizers. In the voltage-ON state, shown in FIG. 8b, the transmissive part of the cell remains unaffected because of no electrode. However, the reflective sub-pixel is activated. The effective phase retardation is $\delta=\pi/4$ so that the light leaks through the crossed polarizer. The transmission and reflection of light in this transflective LCD gives very sharp, clear images. The major advantage of the vertical alignment is its high contrast ratio. For the T pixels, the contrast ratio could exceed 500:1. For the reflective pixels, the contrast ratio exceeds 50:1. The lower contrast ratio for the reflective LCD is because of the surface reflections from the optical components and substrates.

Another outstanding feature of the present invention is the simplicity of the fabrication process. In view of the above descriptions, the novel invention structure is very compatible with present manufacturing techniques. The only extra step in the current fabrication process is to build a wall on the first and second substrate, but no spacer is needed since the wall also acts as the LCD spacer. A high performance and low cost transflective LCD is provided.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A structure of a liquid crystal area for an improved, low-cost, transflective liquid crystal display (TLCD), the liquid crystal area structure consisting of:
    a transmissive portion and a reflective portion in the liquid crystal area of the transflective LCD;
    a serpentine wall structure;
    a set of independent regions in a liquid crystal cell selected from at least one reflective (R) region and at least one transmissive (T) region, wherein the serpentine wall structure separates the set of independent regions in the liquid crystal cell; and
    a first liquid crystal material in the reflective (R) region and a second liquid crystal in the transmissive (T) regions, wherein the only difference between the first and second liquid crystal material is that the birefringence change in the reflective region is one-half of the birefringence change in the transmissive (T) region so that identical transmittance and reflectance for the set of independent regions are achieved.

2. A method of configuring a liquid crystal area for improving a transflective liquid crystal display (TLCD) consisting of the steps of:
    providing a transmissive portion and a reflective portion in the liquid crystal area of the transflective LCD;
    fabricating a serpentine wall on a transparent substrate;
    sealing the serpentine wall to the substrate to form independent transmissive and reflective regions having an equal cell gap;
    filling the transmissive portion with a first liquid crystal material;
    filling the reflective portion with a second liquid crystal material, wherein the only difference between the first and second liquid crystal material is that the second liquid crystal material has a birefringence change of one-half the birefringence change of the first liquid crystal material; and
    passing backlight and ambient light through the TLCD to achieve identical transmittance and reflectance displaying high quality images.

* * * * *